United States Patent
Foster et al.

(10) Patent No.: US 9,957,629 B2
(45) Date of Patent: May 1, 2018

(54) ELECTROPLATED COATINGS

(71) Applicants: John Foster, North Somerset (GB); Zhihong Tang, Carmel, IN (US); Kevin Garing, Indianapolis, IN (US); Bradley J. Burton, Noblesville, IN (US); Thomas F. Lewis, III, Zionsville, PA (US)

(72) Inventors: John Foster, North Somerset (GB); Zhihong Tang, Carmel, IN (US); Kevin Garing, Indianapolis, IN (US); Bradley J. Burton, Noblesville, IN (US); Thomas F. Lewis, III, Zionsville, PA (US)

(73) Assignee: PRAXAIR S.T. TECHNOLOGY, INC., North Haven, CT (US)

( * ) Notice: Subject to any disclaimer, the term of this patent is extended or adjusted under 35 U.S.C. 154(b) by 293 days.

(21) Appl. No.: 14/836,229

(22) Filed: Aug. 26, 2015

(65) Prior Publication Data

US 2016/0237581 A1    Aug. 18, 2016

Related U.S. Application Data

(60) Provisional application No. 62/042,428, filed on Aug. 27, 2014.

(51) Int. Cl.

| | |
|---|---|
| C25D 15/00 | (2006.01) |
| C25D 3/56 | (2006.01) |
| C22C 19/05 | (2006.01) |
| C25D 7/00 | (2006.01) |
| F01D 5/28 | (2006.01) |
| B32B 15/01 | (2006.01) |
| C22C 1/04 | (2006.01) |

(52) U.S. Cl.
CPC ............ C25D 3/562 (2013.01); C22C 19/057 (2013.01); C25D 7/00 (2013.01); C25D 15/00 (2013.01); F01D 5/288 (2013.01); B32B 15/01 (2013.01); C22C 1/0433 (2013.01); F05D 2230/90 (2013.01); F05D 2300/177 (2013.01)

(58) Field of Classification Search
CPC ..................................................... C25D 15/00
See application file for complete search history.

(56) References Cited

U.S. PATENT DOCUMENTS

| | | | |
|---|---|---|---|
| 4,585,481 A | 4/1986 | Gupta et al. | |
| 4,758,480 A * | 7/1988 | Hecht | B32B 15/01 |
| | | | 148/428 |
| 5,037,513 A | 8/1991 | Foster | |
| 5,076,897 A | 12/1991 | Wride et al. | |
| 5,316,866 A * | 5/1994 | Goldman | B32B 15/01 |
| | | | 148/410 |
| 5,558,758 A | 9/1996 | Foster | |
| 5,702,574 A | 12/1997 | Foster et al. | |
| 5,824,205 A | 10/1998 | Foster | |
| 5,833,829 A | 11/1998 | Foster | |
| 5,935,407 A | 8/1999 | Nenov et al. | |
| 6,177,046 B1 * | 1/2001 | Simkovich | C22C 19/03 |
| | | | 148/427 |
| 7,273,662 B2 * | 9/2007 | Gleeson | C22C 5/04 |
| | | | 148/426 |
| 7,476,450 B2 | 1/2009 | Maloney et al. | |
| 8,266,801 B2 | 9/2012 | Clark et al. | |
| 2006/0093752 A1 * | 5/2006 | Darolia | C23C 14/025 |
| | | | 427/523 |
| 2006/0127695 A1 | 6/2006 | Gleeson et al. | |
| 2009/0162684 A1 * | 6/2009 | Creech | C23C 10/02 |
| | | | 428/548 |
| 2010/0266772 A1 * | 10/2010 | Hu | B23K 20/02 |
| | | | 427/328 |
| 2011/0164961 A1 | 7/2011 | Taylor | |
| 2014/0147696 A1 * | 5/2014 | Bolcavage | C23C 28/02 |
| | | | 428/632 |

FOREIGN PATENT DOCUMENTS

| | | |
|---|---|---|
| EP | 0207874 A2 | 1/1987 |
| EP | 0386386 A1 | 9/1990 |
| WO | WO 94/19583 | 9/1994 |

OTHER PUBLICATIONS

Haj-Taieb, M. et al. "Development of High Temperature Electrodeposited LIGA MEMS Materials" Forschungszentrum Karlsruhe in der Helmholtz-Gemeinschaft, Wissenschaftliche Berichte FZKA 7492 (Oct. 2009) 142 pages.

* cited by examiner

Primary Examiner — Rip A Lee
(74) Attorney, Agent, or Firm — Nilay S. Dalal (57) ABSTRACT

A modified electroplated nickel-based metallic alloy coating and method of forming the same is provided. The electroplated coatings exhibit unique microstructure and composition which improves performance over conventional metallic materials. The coatings have significantly higher strength at elevated service temperatures.

19 Claims, 3 Drawing Sheets

Figure 1 is a schematic description of a turbine blade which is coated with abrasive coating comprising abrasive particles in a metallic matrix.

FIG. 1

Figure 2 shows a graphical comparison of the measured ultimate tensile stress of the electroplated coating of the present invention and a conventional MCrAlY coating in the temperature range of 800-1000 °C.

FIG. 2

Figure 3 compares the measured cyclic oxidation resistance at 1133 °C of the electroplated coating of the present invention with those of a conventional MCrAlY coating and a conventional nickel-based superpolly.

FIG. 3

Figure 4 is a scanning electron microscopy (SEM) image of a cross-sectional microstructure of the electroplated coating of the present invention showing a bimodal γ' phase distribution in a γ phase in which the sample was etched with marble's reagent.

FIG. 4

Figure 5 is a scanning electron microscopy (SEM) image of a cross-sectional microstructure of the electroplated coating of the present invention comprising uniform fine γ' phase precipitates in a γ phase in which the sample was etched with marble's reagent.

FIG. 5

Figure 6 is a scanning electron microscopy (SEM) image of a cross-sectional microstructure of a conventional MCrAlY coating comprising γ and β phases.

FIG. 6

ELECTROPLATED COATINGS

The present application claims priority from U.S. Provisional Application Ser. No. 62/042,428, filed Aug. 27, 2014, which is incorporated by reference herein in its entirety.

FIELD OF THE INVENTION

The present invention relates to novel electroplated coatings having a unique microstructure and composition. The coatings are advantageous for gas turbine components. Particularly, the coatings offer increased strength and can serve as suitable coatings for variety of components, including gas turbine blades with abrasive tips.

BACKGROUND OF THE INVENTION

Abrasive sealing systems are currently used in gas turbines to reduce the blade tip gas leakage, which can improve turbine efficiency. In the turbine, the early stages of the high pressure turbine section are generally comprised of nickel-based superalloy blades that rotate at high speed. These blades are designed such that their respective tips are situated in close proximity to a stationary seal ring. As a result, a narrow gap exists between the tips and the seal ring. The purpose of the narrow gap is to minimize gas leakage and to allow the pressure of the air to do work against the turbine blades, thereby causing the blades to rotate. A narrow gap leads to higher engine efficiency and greater power output. However, a narrow gap also increases the risk of "tip rub", defined as the tip contacting the seal and thereby causing excessive wear on the seal and the components.

Figure 1:
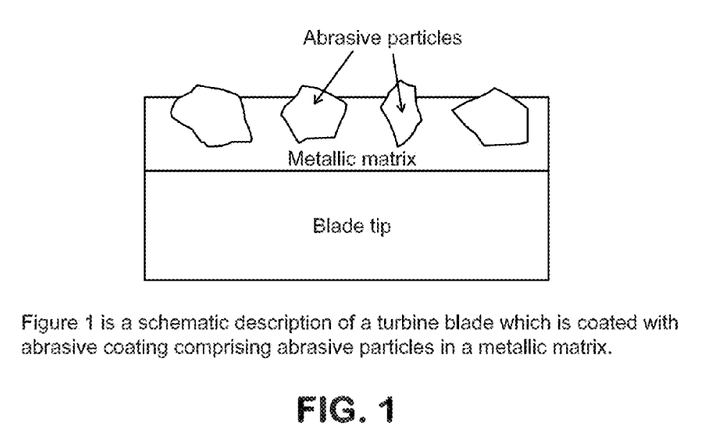
FIG. 1 is a schematic description of a tip of turbine blade which is coated with abrasive coating comprising abrasive particles in a metallic matrix.

The tips of the blades can be applied with an abrasive coating to improve the seal between blade tips and stationary ring. The abrasive coating comprises abrasive particles embedded in a metallic matrix, as described in FIG. 1. Cubic Boron Nitride (CBN) is a typical abrasive material used for such purpose. The metallic matrix holds or anchors the abrasive particles and maintains attachment of the particles to the turbine tip during service. To work effectively, the metallic matrix must have high-temperature strength to resist any deformation during service; environmental resistance to prevent material loss from high-temperature oxidation and corrosion; and chemical compatibility with the tips of the blades to ensure absence of formation of brittle phases, which are known as topologically close-packed phases ("TCP's").

Conventional metallic matrix materials have typically utilized MCrAlY, where M is defined as nickel, cobalt, or nickel and cobalt in any combination. MCrAlY coatings are known for their environmental resistance. The MCrAlY coatings primarily consist of a gamma-nickel phase and a beta-nickel aluminide phase. Although MCrAlY coatings have excellent environment resistance, the MCrAlY coatings exhibit insufficient strength to resist the deformation at elevated service temperatures, particularly at 800° C. and higher. Another problem with conventional MCrAlY coatings is interdiffusion of these coatings with advanced superalloy substrates which causes phase instability at the interface and degrades the mechanical performance of the superalloy substrates. Thus, MCrAlY coatings tend to have a limited lifetime during service temperatures of 800° C. and higher. The term "service temperature" as used herein and throughout the specification refers to the range of operating temperatures a particular coated component is exposed to when in commercial usage. The service temperature serves as an indicator of the thermal stability of the coating.

Other metallic matrix materials have also shown limited operational lifetime at higher service temperatures. In view of the drawbacks, there is a need to increase the high-temperature strength of the metallic matrix for abrasive coatings while substantially maintaining the resistance to high-temperature oxidation. This is a need to improve performance of stand-alone coatings and overlay coatings requiring higher strength at their operating temperatures.

SUMMARY OF THE INVENTION

The invention may include any of the following aspects in various combinations and may also include any other aspect of the present invention described below in the written description.

In a first aspect, an electroplated coating comprising: a nickel-based metallic electroplated composition comprising about 5-15 wt % cobalt, about 5-10 wt % chromium, about 5-10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt. % silicon, 0 to about 0.2 wt % carbon, 0 to about 0.03 wt % boron and a remainder of nickel; said composition characterized by a multi-phase microstructure defined at least in part by a gamma nickel solid solution phase ($\gamma$-Ni phase) and a gamma prime phase of nickel aluminide ($\gamma'$-$Ni_3Al$ phase) distributed within said $\gamma$-Ni phase; said $\gamma'$-$Ni_3Al$ phase including a bimodal microstructure comprising a primary $\gamma'$-$Ni_3Al$ phase and a secondary $\gamma'$-$Ni_3Al$ phase; said secondary $\gamma'$-$Ni_3Al$ phase having a particle size smaller than that of the primary $\gamma'$-$Ni_3Al$ phase; said $\gamma'$-$Ni_3Al$ phase optionally including a uniform distribution within said $\gamma$-Ni phase; wherein said $\gamma'$-$Ni_3Al$ phase is contained in an amount that is at least about 40 vol % but no greater than about 90 vol % to thereby produce an ultimate tensile strength at service temperatures that is greater in comparison to a coating having a MCrAlY composition.

In a second aspect, a method of forming an electroplated coating comprising: providing a superalloy substrate; providing a plating solution comprising a nickel plating solution with a precursor alloy powder wherein said precursor alloy powder comprises CoCrAlX or NiCoCrAlX, where X is one or more of Re, Ta, Mo, W, Hf, Y, Si, Zr, C, B or any combination thereof; electroplating said nickel and said precursor alloy powder onto the substrate to form a green coating having a composition comprising about 5-15 wt % cobalt, about 5-10 wt % chromium, about 5-10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt. % silicon, 0 to about 0.2 wt % carbon, 0 to about 0.03 wt % boron and a remainder of nickel; performing a first heat treatment of said green coating at a temperature ranging from about 2000° F. to 2400° F. for a duration of about 2 to about 6 hours; and allow the interdiffusion between the CoCrAlX or NiCoCrAlX powder composition and nickel to produce an intermediate coating; performing a second heat treatment of said composition at a temperature ranging from about 1400° F. to about 1950° F. for a duration of about 6 to about 48 hours; and precipitating the gamma-prime nickel aluminide phase ($\gamma'$-$Ni_3Al$ phase) to produce the modified electroplated coating.

In a third aspect, an electroplated coating comprising: a nickel-based metallic electroplated composition comprising about 5-15 wt % cobalt, about 5-10 wt % chromium, about 5-10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt. % silicon, 0 to about 0.2 wt % carbon, 0 to about 0.03 wt % boron and a remainder of nickel; said composition characterized by a multi-phase microstructure defined at least in part by a gamma nickel solid solution phase ($\gamma$-Ni phase) and a gamma prime phase of nickel aluminide ($\gamma'$-Ni$_3$Al phase) distributed within said $\gamma$-Ni phase; wherein said $\gamma'$-Ni$_3$Al phase is contained in an amount that is at least about 40 vol % but no greater than about 90 vol % to thereby produce an ultimate tensile strength at service temperatures that is greater in comparison to a coating having a MCrAlY composition; said electroplated coating may further comprise at least one of Pt, Ir and Pd or any combination thereof.

Other aspects, features and embodiments of the disclosure will be more fully apparent from the ensuing description and appended claims.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein.

DETAILED DESCRIPTION OF THE INVENTION

The disclosure is set out herein in various embodiments, and with reference to various features and aspects of the invention. The disclosure contemplates such features, aspects and embodiments in various permutations and combinations, as being within the scope of the disclosure. The disclosure may therefore be specified as comprising, consisting or consisting essentially of, any of such combinations and permutations of these specific features, aspects and embodiments, or a selected one or ones thereof.

The present invention is directed to a modified electroplated nickel-based metallic alloy coating that is used as the metallic matrix for abrasive coating on blade tips. The electroplated coating of present invention exhibits improved performance over conventional metallic materials. The coating has a unique microstructure and composition that in combination create increased strength at elevated service temperatures in comparison to conventional coatings. The electroplated coating has a multi-phase microstructure that is defined at least in part by a gamma nickel solid solution ($\gamma$-Ni) and a gamma-prime nickel aluminide intermetallic phase ($\gamma'$-Ni$_3$Al). The $\gamma'$-Ni$_3$Al phase is contained in an amount that is at least about 40 vol % but no greater than about 90 vol %, based on the overall volume of the coating. The $\gamma'$-Ni$_3$Al phase is a distinct phase that is located within the solid solution matrix of $\gamma$-Ni. The $\gamma'$-Ni$_3$Al phase is formed upon precipitation to strengthen an otherwise weak $\gamma$-Ni phase. The $\gamma'$-Ni$_3$Al phase is maintained within a range of about 40-90% to achieve the desired strengthening effects of the $\gamma'$-Ni$_3$Al precipitates.

Figure 2:
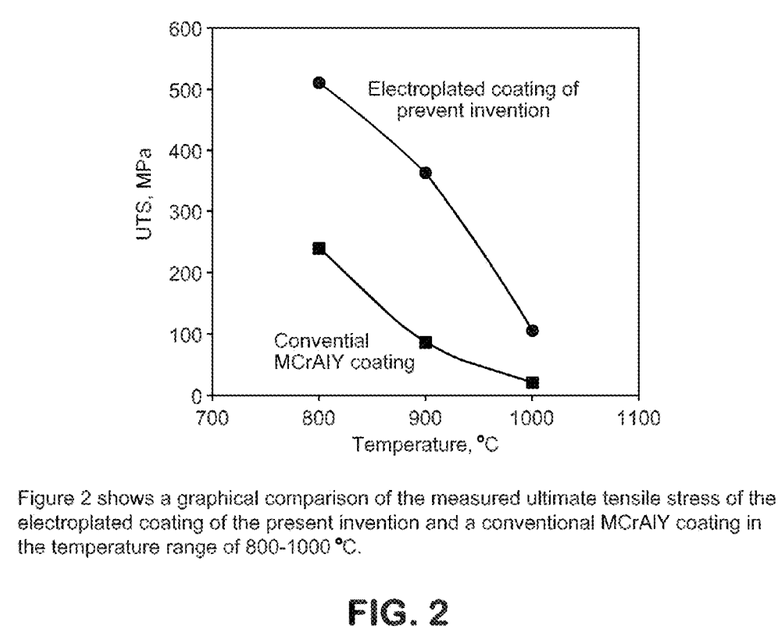
FIG. 2 shows a graphical comparison of the measured ultimate tensile stress of the electroplated coating of the present invention and a conventional MCrAlY coating in the temperature range of 800-1000° C.

The modified metallic alloy coating of the present invention has superior performance over conventional materials. For example, and as will be explained in greater detail in the working examples below, the present invention produces a coating having higher strength at 800° C. and greater in comparison to conventional metallic matrix materials. A comparison of the inventive electroplated coating with a conventional MCrAlY coating indicates the inventive coating has an increased ultimate tensile strength by a factor of about 2-5 over the conventional MCrAlY at elevated service temperatures ranging from 800° C.-1000° C. The graphical comparison is shown in FIG. 2.

As demonstrated by Applicants in Example 4, the electroplated coating of the present invention has substantially equivalent oxidation resistance to that of a conventional MCrAlY coating. Accordingly, unlike conventional MCrAlY coatings, the electroplated coating of the present invention achieves greater high-temperature strength (Examples 1-3) relative to a conventional MCrAlY coating while substantially maintaining resistance to high-temperature oxidation.

As will be explained, the performance improvement of the modified electroplated coating of the present invention is at least partially attributed to the unique coating microstructure, which is produced by a combination of coating composition, coating process and a specialized post heat-treatment. The strengthening effects of the coating originate at least in part from the synergistic interaction of the multi-phase structures of $\gamma'$-Ni$_3$Al and $\gamma$-Ni. The $\gamma'$-Ni$_3$Al is distributed within the gamma nickel matrix ($\gamma$-Ni matrix) as shown in the scanning electron microscopy image of a cross-sectional microstructure of FIG. 4. It should be understood that "$\gamma$-Ni" is used interchanagbly with "$\gamma$". At least 40 vol % of the $\gamma'$-Ni$_3$Al is required in order to generate and maintain the necessary amount of stress in the coating to exhibit the increased strengthening effects of the gamma prime precipitates. However, the volume fraction of $\gamma'$-Ni$_3$Al should not exceed greater than 90%. Without being bound by any particular theory, it is believed that exceeding 90 vol % increases coating brittleness and may cause coating cracking during service. Preferably, the $\gamma'$-Ni$_3$Al is contained in a range between 55 to 85 vol % and more preferably in a range between 65 to 75 vol %.

Figure 4:
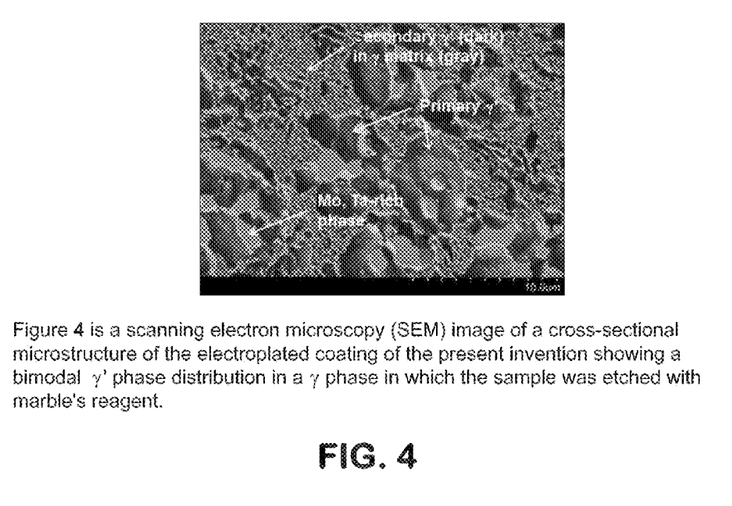
FIG. 4 is a scanning electron microscopy (SEM) image of a cross-sectional microstructure of the electroplated coating of the present invention showing a bimodal $\gamma'$ phase distribution in a $\gamma$ phase in which the sample was etched with marble's reagent.

Still referring to FIG. 4, the $\gamma'$-Ni$_3$Al can be characterized by a bimodal microstructure comprising a primary $\gamma'$-Ni$_3$Al and a secondary γ'-Ni$_3$Al. The primary γ'-Ni$_3$Al consist of coarse discrete particles ranging in size from about 2-8 microns (μm). The secondary γ'-Ni$_3$Al consist of fine discrete particles having a particle size ranging from about 0.2-0.5 μm. Both the primary γ'-Ni$_3$Al (i.e., "Primary γ'") and the secondary γ'-Ni$_3$Al (i.e., "Secondary γ'") in the scanning electron microscopy image of FIG. 4 are shown as darker in appearance relative to the lighter gray appearing γ nickel-phase. The primary and secondary γ'-Ni$_3$Al phase are distributed within the γ nickel matrix, which is shown to extend continuously throughout the coating. The matrix provides a support-like structure for the precipitates of the primary and the secondary γ'-Ni$_3$Al phases. The primary and secondary γ'-Ni$_3$Al phases are distributed within the matrix so as to interact to impart a high-temperature strength at 800° C. and greater.

Figure 5:
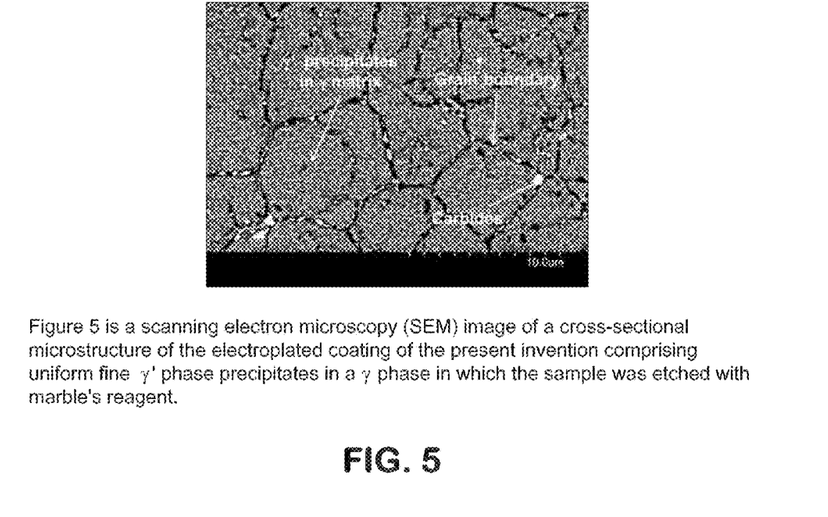
FIG. 5 is a scanning electron microscopy (SEM) image of a cross-sectional microstructure of the electroplated coating of the present invention comprising uniform fine $\gamma'$ phase precipitates in a $\gamma$ phase in which the sample was etched with marble's reagent.

In an alternative embodiment, the γ'-Ni$_3$Al can be characterized by a uniform microstructure comprising fine γ'-Ni$_3$Al precipitates in a γ-matrix as shown in FIG. 5. The fine γ'-Ni$_3$Al precipitates can have a particle size ranging from about 0.2-0.5 μm.

Figure 6:
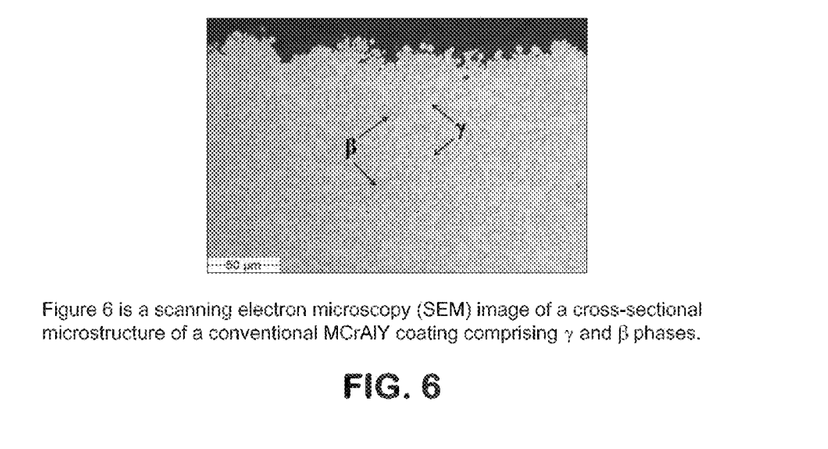
FIG. 6 is a scanning electron microscopy (SEM) image of a cross-sectional microstructure of a conventional MCrAlY coating comprising $\gamma$ and $\beta$ phases.

Unlike conventional materials such as MCrAlY, the electroplated coating of the present invention is characterized by the absence of any beta nickel aluminide phases (β), which may reduce the strength of the metallic matrix of abrasive coating. MCrAlY is characterized by a microstructure primarily defined as containing γ and β without any γ' volume fraction. Both the γ and β phases are intrinsically weak at the elevated temperatures and are believed to substantially weaken the tensile strength of the resultant MCrAlY coating. A representative SEM microstructure of the conventional MCrAlY coating is shown in FIG. 6. As can be seen, the MCrAlY possesses an entirely different microstructure than those of FIGS. 4 and 5.

The present invention may also include optional molybdenum and tantalum (Mo—Ta) enriched phase distributed within the γ nickel matrix, as shown in FIG. 4. The (Mo—Ta) enriched phase appears as cluster-like particles throughout certain regions of the γ nickel-based matrix. The optional (Mo—Ta) enriched phase is contained in an amount varying from 0 to 15 volume %, preferably 0 to 10% and more preferably less than 5%. The presence of the (Mo—Ta) enriched phase may potentially enhance the high-temperature strength of the γ nickel matrix. However, high fraction of (Mo—Ta) enriched phase may potentially degrade the high-temperature oxidation resistance.

In addition to the unique coating microstructure, the improved performance of the modified electroplated coating of the present invention is at least partially attributed to the electroplated composition. The coating contains a nickel-based electroplated composition. In one embodiment of the present invention, the nickel-based metallic electroplated composition comprises about 5-15 wt % cobalt, about 5-10 wt % chromium, about 5-10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt. % silicon, 0 to about 0.2 wt % carbon, 0 to about 0.03 wt % boron and the remainder nickel. The coating composition of this invention significantly differs from conventional MCrAlY coatings from prior arts which contemplate significantly higher Al and Cr content. For example, U.S. Pat. No. 4,585,481 describes a coating composition for the protection of metallic substrates against high temperature oxidation and corrosion having up to 40% Cr and up to 35% Al.

Furthermore, the Al and Cr concentrations in the electroplated coating of present invention are similar to those of a nickel-base superalloy substrate, thus minimizing the interdiffusion between the coating and substrate during high-temperature exposure and suppressing the formation of detrimental topologically close-packed phases in the diffusion zone between coating and substrate.

In this invention, the aluminum content in the coating is preferably from about 5 to 10 weight percent. Aluminum can assist in strengthening effects of the resultant coating of the present invention. Aluminum contributes to high-temperature strength by enabling the formation of γ'-Ni$_3$Al phase and imparting a desirable oxidation resistance by forming a protective alumina scale. When the aluminum content falls below about 5 weight percent, there can be an insufficient fraction of γ'-Ni$_3$Al phase such that to necessary strength is not achieved. Additionally, elevated levels of aluminum content greater than about 10 weight percent can induce or promote the formation of the weak β-NiAl phase.

The other constituents also impart desirable properties. Tantalum and titanium when present in the prescribed amounts can further increase the fraction of γ'-Ni$_3$Al phase and also promote the formation of carbides at the grain boundary of γ-Ni phase, which further improves the strength by inhibiting so-called grain-boundary sliding. Molybdenum, tungsten, and rhenium aid in the solid-solution strengthening of γ-Ni solid solution phase. Chromium contributes to the environmental resistance by facilitating the formation of protective alumina scale even when at such a low aluminum content of about 5 wt. %. However, chromium content above the amounts of the present invention tends to promote the formation of brittle sigma phase. Hafnium, yttrium and zirconium, when added within the prescribed amounts, can improve the oxidation resistance of the resultant coating.

Other variations to the electroplated composition are contemplated by the present invention. For example, the electroplated composition can comprise about 8-12 wt % cobalt, about 6-9 wt % chromium, about 5.5-7 wt % aluminum, and the total of titanium, zirconium, carbon, boron, molybdenum, tungsten, rhenium, and tantalum being contained in an amount between about 3-12 wt % and the remainder nickel.

Still other embodiments are contemplated without departing from the spirit and scope of the present invention. For example, in yet another embodiment, each of said boron, carbon, molybdenum, tungsten and titanium is 0%. The electroplated composition may also contain at least one of Pt, Ir and Pd or any combination thereof.

The coating of the present invention is produced by a suitable electroplating process designed for entrapment plating of a precursor alloy powder from a bath of nickel plating solution having precursor powder suspended therein. The invention can be practiced using the same apparatus as described in U.S. Pat. Nos. 5,076,897, 5,702,574, and 5,833,829, each of which is incorporated by reference herein in its entirety. In one embodiment of the present invention, the precursor alloy powder can be represented by the general formula CoCrAlX or CoNiCrAlX where X as used herein and throughout the specification is one or more of Re, Ta, Mo, W, Hf, Y, Si, Zr, C and B. The Ni is provided in the form of a plating solution. Alternatively, Ni and/or Co can be used as the plating solution. The total weight percent of CoCrAlX or CoNiCrAlX precursor powder that is trapped by the electroplating process preferably accounts for 30-40% of the total coating weight. The CoCrAlX or CoNiCrAlX precursor powder can be produced by gas atomization process, which is known in the art by one of ordinary skill in the art. The total percent of refractory elements including Ta, W, Mo, Re, Ti, Hf, Y and Zr is maintained at the prescribed levels of less than 20% to enable gas atomization of the precursor powder.

The electroplating process is in accordance with the methods described in U.S. Pat. Nos. 5,076,897, 5,702,574, and 5,833,829, each of which is incorporated by reference herein in its entirety. The electroplating process can occur as follows. The particles, which are in suspension in the electroplating solution, are entrapped within the coating as the electrodeposited matrix is formed and built up. This so-called "green" coating can then be heat treated to form the desired coating structure exhibiting high temperature strength properties.

In accordance with the principles of the present invention, the electroplating process allows the formation of the "green" coating having CoCrAlX or CoNiCrAlX precursor powder that is embedded within a Ni matrix. Compared to conventional thermal spray and physical vapor deposition (PVD) processes, the entrapment plating process utilized in the present invention provides several unique and technical advantages that enables the creation of the coatings of the present invention. For example, entrapment plating is particularly well suited for parts with complex geometries as there are no "line-of sight" complications that exist with thermal spraying. Additionally, entrapment plating is considered a cold process and avoids the chemical reaction between abrasive particles and the metallic matrix that can occur during plasma spray methods. Still further, entrapment plating offers improvements in the accuracy and control of the resultant coating composition, as the feedstock material is not significantly altered during the deposition.

After electroplating has occurred, a two-step heat treatment can be performed to achieve the desired coating structure and properties. A first heat treatment is performed on the electroplated "green" coating ranging from about 2000° F. to 2400° F. for a duration of about 2 to 6 hrs. This first heat-treatment allows the interdiffusion between the CoCrAlX or NiCoCrAlX powder composition and nickel plating matrix to produce an intermediate coating. Next, a second heat treatment can be performed at a temperature ranging from about 1400° F. to about 1950° F. for a duration of about 6 to about 48 hours. The second heat-treatment induces the precipitation the gamma-prime nickel aluminide phase ($\gamma'$-$Ni_3Al$ phase) to produce the modified electroplated coating.

Due to the relatively slow diffusion rates of several of the constituents, the resultant microstructure does not reach equilibrium and therefore produces a modified structure. The modified structure can be characterized by a predetermined size and/or distribution of $\gamma'$-$Ni_3Al$ precipitates, carbides, or other phases designed to improve performance, such as high-temperature strength. The degree of modification will depend on several factors, such as temperature, time and cooling rates. As can be seen, a combination of proper selection of coating composition, coating process and post treatment can produce the class of inventive electroplated coatings.

In a preferred embodiment, the electroplated coating of the present invention can be used as the metallic matrix for an abrasive coating on blade tips. The process to produce the abrasive coating comprises the following: producing an electroplated coating of the present invention as the first layer on the blade tips by electroplating from a bath of plating solution having CoCrAlX or CoNiCrAlX precursor powder suspended in the plating solution; anchoring the abrasive particles to the first layer by electroplating from a bath of plating solution having the abrasive particles suspended in the plating solution; and infilling around the abrasive particles with the electroplated coating of the present invention by electroplating from a bath of plating solution having CoCrAlX or CoNiCrAlX precursor powder suspended in the plating solution. Suitable abrasive particles include cubic boron nitride, alumina, silicon carbides, or other type of nitrides, oxides and carbides.

It should be understood that variations are contemplated. For example, the electroplated coating for infilling around the abrasive particles may have a different composition from the electroplated coating for the first layer of abrasive coating.

Applicants have discovered that other methods of applying the precursor powder are not suitable for creating the coating. For instance, plasma spray processes may not be suitable for creating the inventive coating, as the temperature of the plasma is too high such that the metallic matrix reacts with the abrasive particles and significantly degrades the properties of abrasive coating. Additionally, plasma spray and physical vapor deposition processes are "line-of-sight" process and not suitable for coating the parts having complex geometries, for example, turbine blade tips In addition to the abrasive coatings discussed herein, it should be understood that various other end-use applications are contemplated by the present invention. For example, the electroplated coating of the present invention can be produced without the addition of abrasive particles and be used as overlay coatings to protect metallic substrates against high-temperature oxidation and corrosion. The electroplated coating of this invention can also be used a bond coat for a thermal barrier coating system. Additionally, the inventive electroplated coatings can be utilized to create electroformed materials with near-net shape of the desired object. The coatings of the present invention can be used to produce an electroformed micro-specimen for micro-electro-mechanical systems (MEMS) and LIGA applications. Further, the present invention can be employed in various other manufacturing techniques whereby free standing, seamless and near net shape parts can be produced, such as, by way of example, additive manufacturing or near net shape electroform manufacturing deposition processes.

The working examples below demonstrate that the electroplated coating exhibits significantly higher ultimate strength at elevated service temperatures of 800° C.-1000° C. It should be understood that the working examples are not intended in any way to limit the scope of the present invention, but rather are intended to illustrate principles of the present invention.

COMPARATIVE EXAMPLE 1

Conventional MCrAlY Tested for UTS at 800° C.

A conventional free-standing MCrAlY coating was prepared for purposes of comparing its intrinsic high-temperature strength with that of the present invention.

The process to produce a free-standing coating of the conventional MCrAlY coating involved the following steps. First, a precursor CrAlY powder was prepared by gas atomization. The composition of the precursor powder in weight percentage was Cr-35% Al-1% Y.

Next, the precursor CrAlY powder was entrapment plated from a bath of nickel and cobalt sulfate plating solution onto an aluminum sheet. This entrapment plating process was performed in accordance with the methods described in U.S.

Pat. Nos. 5,076,897, 5,702,574, and 5,833,829, each of which is incorporated by reference herein in its entirety. The weight percent of CrAlY precursor powder that was entrapped by the electroplating process accounted for 32% of the total coating weight. The electroplating process led to the formation of a "green coating" having CrAlY particles embedded within the Ni/Co matrix. The thickness of the resultant green coating was determined to be about 0.5-1 millimeter.

The aluminum sheet was subsequently placed in 30% sodium hydroxide solution to selectively leach out the aluminum sheet while maintaining the green coating structurally intact. After removal of aluminum sheet, a "green" free-standing coating sheet was obtained.

The coating sheet was then heat-treated to allow inter-diffusion between constituents of the matrix and the particles. The heat-treatment condition was performed under vacuum at a temperature of 1120° C. for 6 hours. This produced a free-standing conventional electroplated NiCoCrAlY sheet with a thickness of 0.5-1 millimeter. The cross-sectional microstructure of this coating is shown in FIG. 6. The coating consisted of two primary phases: γ-Ni solid solution phase shows in bright gray in FIG. 6 and β-NiAl phase shows in dark gray in FIG. 6. The composition of the resultant free-standing coating was Ni-24% Co-19.5% Cr-10.5% Al-0.3% Y in weight percent.

The flat tensile test specimen was machined and polished from the electroplated sheet per ASTM standard E8. The testing specimen had a gauge length of 32 millimeters and a width of 6 millimeters. The strain rate for tensile test was 0.002 per minute up to approximately 1% and thereafter 0.1 per minute until fracture. The tensile test was conducted at 800° C. (1470° F.). The ultimate tensile strength of the conventional electroplated NiCoCrAlY coating was determined to be 240 MPa.

COMPARATIVE EXAMPLE 2

Conventional MCrAlY Tested for UTS at 900° C.

The process to produce another free-standing coating of conventional MCrAlY coating was the same as described in Comparative Example 1. The composition of the resultant free-standing coating was Ni-24% Co-19.5% Cr-10.5% Al-0.3% Y in weight percent.

The UTS testing procedure was performed as described in Comparative Example 1. The flat tensile test specimen was machined and polished from the electroplated sheet per ASTM standard E8. The testing specimen has a gauge length of 32 millimeter and a width of 6 millimeter. The strain rate for the tensile test was 0.002 per minute up to approximately 1% and thereafter 0.1 per minute until fracture. The tensile test was conducted at 900° C. (1652° F.). The ultimate tensile strength of the conventional electroplated NiCoCrAlY coating was determined to be 87 MPa.

COMPARATIVE EXAMPLE 3

Conventional MCrAlY Tested for UTS at 1000° C.

The process to produce another free-standing coating of conventional MCrAlY coating was the same as described in Comparative Example 1. The composition of the resultant free-standing coating was Ni-24% Co-19.5% Cr-10.5% Al-0.3% Y in weight percent.

The UTS testing procedure was performed as described in Comparative Example 1. The flat tensile test specimen was machined and polished from the electroplated sheet per ASTM standard E8. The testing specimen has a gauge length of 32 millimeter and a width of 6 millimeter. The strain rate for tensile test is 0.002 per minute up to approximately 1% and thereafter 0.1 per minute until fracture. The tensile test was conducted at 1000° C. (1832° F.). The ultimate tensile strength of the conventional electroplated NiCoCrAlY coating at 1000° C. was determined to be 21 MPa.

EXAMPLE 1

Electroplated Coating of Present Invention Tested for UTS at 800° C.

A free-standing coating with the coating composition as described in the present invention was prepared in order to compare the intrinsic high-temperature strength of electroplated coating in the present invention with those of Comparative Examples 1, 2 and 3. The process to produce the free-standing coating of the present invention involved the following. A precursor CoCrAl-based alloy powder was prepared by gas atomization. The composition of precursor powder in weight percentage was 28.4% Co-22.7Cr-17% Mo-17% Al-2.8% Ti-11.4% Ta-0.3% Zr-0.3% C-0.04% B.

Next, the precursor CoCrAl-based alloy powder was entrapment plated from a bath of nickel sulfate plating solution onto an aluminum sheet. The entrapment plating process was performed in accordance with the methods described in U.S. Pat. Nos. 5,076,897, 5,702,574, and 5,833,829, each of which is incorporated by reference herein in its entirety. The weight percent of CoCrAl-based precursor powder that is trapped by the electroplating process accounted for 36% of the total coating weight. The electroplating process led to the formation of a "green coating" having CoCrAl-based particles embedded within a Ni matrix. The thickness of the resultant green coating was about 0.5-1 millimeters. The aluminum sheet was subsequently placed in 30% sodium hydroxide solution to selectively leach out aluminum sheet while maintaining the green coating structurally intact. After removal of the aluminum sheet, a "green" free-standing coating sheet was obtained.

The coating sheet was heat-treated to obtain inter-diffusion between constituents of the matrix and the particles. The heat-treatment condition was performed under vacuum at a temperature of 1120° C. for 6 hours. This produced a free-standing electroplated metallic coating of the present invention. The coating consisted of gamma prime ($\gamma'$-$Ni_3Al$) precipitates within the nickel matrix ($\gamma$-Ni matrix) as shown in FIG. 4. The volume fraction of $\gamma'$-$Ni_3Al$ precipitates was determined to be about 65%. Moreover, the $\gamma'$-$Ni_3Al$ was characterized by a bimodal microstructure comprising a primary $\gamma'$-$Ni_3Al$ and a secondary $\gamma'$-$Ni_3Al$. The primary $\gamma'$-$Ni_3Al$ consisted of coarse discrete particles ranging in size from about 2-8 microns (μm). The secondary $\gamma'$-$Ni_3Al$ consisted of fine discrete particles having a particle size ranging from about 0.2-0.5 μm. The composition (in weight percent) of free-standing coating in this invention was Ni: balance
Cr: 8%
Co: 10%
Mo: 6%
Al: 6%
Ti: 1%
Ta: 4%
Zr: 0.1%
C: 0.1%
B: 0.015%

The flat tensile test specimen was machined and polished from the electroplated sheet per ASTM standard E8. The testing specimen had a gauge length of 32 millimeters and a width of 6 millimeters. The strain rate for tensile test was 0.002 per minute up to approximately 1%, and thereafter 0.1 per minute until fracture. The tensile test was conducted at 800° C. (1652° F.). The ultimate tensile strength of the new metallic coating of the present invention was determined to be 510 MPa, which is more than 2× higher than that (240 Mpa) of conventional NiCoCrAlY coating at 800° C. as described in Comparative Example 1.

EXAMPLE 2

Electroplated Coating of Present Invention Tested for UTS at 900° C.

The process to produce another free-standing coating of the present invention was the same as described in Example 1

The UTS testing procedure was performed as described in Example 1. The flat tensile test specimen was machined and polished from the electroplated sheet per ASTM standard E8. The testing specimen had a gauge length of 32 millimeter and a width of 6 millimeter. The strain rate for tensile test was 0.002 per minute up to approximately 1% and thereafter 0.1 per minute until fracture. The tensile test was conducted at 900° C. (1470° F.). The ultimate tensile strength of the new metallic coating in the present invention was determined to be 363 MPa, which is more than 4× higher than that (87 MPa) of conventional NiCoCrAlY coating at 900° C. as described in Comparative Example 2.

EXAMPLE 3

Electroplated Coating of Present Invention Tested for UTS at 1000° C.

The process to produce another free-standing coating of the present invention was the same as described in Example 1.

The UTS testing procedure was performed as described in Example 1. The flat tensile test specimen was machined and polished from the electroplated sheet per ASTM standard E8. The testing specimen has a gauge length of 32 millimeter and a width of 6 millimeter. The strain rate for tensile test is 0.002 per minute up to approximately 1% and thereafter 0.1 per minute until fracture. The tensile test was conducted at 1000° C. (1470° F.). The ultimate tensile strength of the new metallic coating in the present invention was determined to be 106 MPa, which is more than 5× higher than that (21 MPa) of conventional NiCoCrAlY coating at 1000° C. as described in Comparative Example 3. It was observed that the ultimate tensile strength (106 MPa) of the new coating of the present invention at 1000° C. is even higher than the ultimate tensile strength (87 MPa) of conventional NiCoCrAlY coating at 900° C., revealing that the new coating can increase service temperature by 100° C. or higher over conventional NiCoCrAlY coatings.

EXAMPLE 4

Cyclic Oxidation Performance of Present Invention

A furnace cycle test was performed to compare the cyclic oxidation resistance at 1133° C. of the electroplated coating of the present invention with those of a conventional MCrAlY coating and a conventional nickel-based superalloy commercially available as CMSX-4® from Cannon-Muskegon Corp. (Muskegon, Mich.).

The process to produce the free-standing electroplated coating of the present invention was the same as described in Example 1. The process to based superalloy commercially available from Cannon-Muskegon Corp. (Muskegon, Mich.).

The furnace cycle test was performed at 1133° C. in air. Each cycle consisted of 50 minutes dwell at 1133° C. followed by 10 minutes cooling to room temperature. The cyclic oxidation resistance was characterized by a plot of specific weight change as a function of number of cycles, as shown in FIG. 3.

Figure 3:
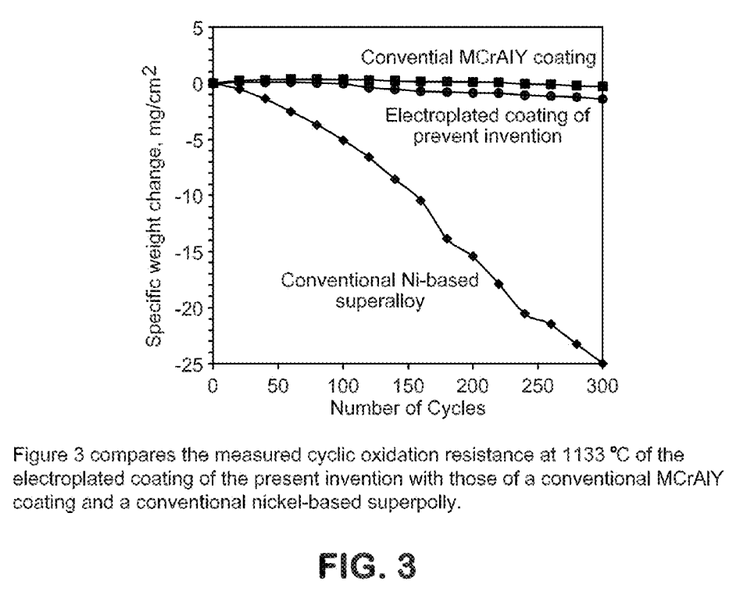
FIG. 3 compares the measured cyclic oxidation resistance at 1133° C. of the electroplated coating of the present invention with those of a conventional MCrAlY coating and a conventional nickel-based superalloy.

As shown in FIG. 3, the negative weight gain is an indicator of poor resistance to cyclic oxidation. The result indicated that the electroplated coating of the present invention exhibited approximately equivalent oxidation resistance to that of the conventional MCrAlY coating. The electroplated coating of the present invention and the conventional MCrAlY coating showed significantly higher oxidation resistance than that of the conventional nickel-based superalloy, CMSX-4®.

The above tests demonstrate the electroplated coating of the present invention has significantly higher tensile strength without a substantial decrease in oxidation resistance relative to conventional MCrAlY coatings.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:
1. An electroplated coating comprising:
a nickel-based metallic electroplated composition comprising about 5-15 wt % cobalt, about 5-10 wt % chromium, about 5- 10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt % silicon, 0 to about 0.2 wt % carbon, 0 to about 0.03 wt % boron and a remainder of nickel;
said composition characterized by a multi-phase microstructure defined at least in part by a gamma nickel solid solution phase (γ-Ni phase) and a gamma prime phase of nickel aluminide (γ'-Ni$_3$Al phase) distributed within said γ-Ni phase;
said γ'-Ni$_3$Al phase including a bimodal microstructure comprising a primary γ'-Ni$_3$Al phase and a secondary γ'-Ni$_3$Al phase; said secondary γ'-Ni$_3$Al phase having a particle size smaller than that of the primary γ'-Ni$_3$Al phase;
said γ'-Ni$_3$Al phase optionally including a uniform distribution within said γ-Ni phase;
wherein said γ'-Ni$_3$Al phase is contained in an amount that is at least about 40 vol % but no greater than about 90 vol % to thereby produce an ultimate tensile strength at service temperatures that is greater in comparison to a coating having a MCrAlY composition.
2. The electroplated coating of claim 1, wherein said electroplated coating produces an ultimate tensile strength corresponding to a temperature of 800° C. or greater that is at least two times higher in comparison to a coating having a MCrAlY composition.

3. The electroplated coating of claim 1, further comprising abrasive particles embedded within the electroplated composition.

4. The electroplated coating of claim 3, wherein said abrasive particles is selected from the group consisting of cubic boron nitride, alumina, silicon carbides, or other type of nitrides, oxides and carbides.

5. The electroplated coating of claim 1, wherein said γ'-Ni$_3$Al phase is contained in a volume fraction ranging between about 65-75 vol %.

6. The electroplated coating of claim 1, characterized by an increased high-temperature strength while substantially maintaining the resistance to high-temperature oxidation in comparison to the coating having the MCrAlY composition.

7. The electroplated coating of claim 1, further comprising said γ'-Ni$_3$Al phase is in a uniform distribution within said γ-Ni phase.

8. The electroplated coating of claim 1, wherein each of said boron, carbon, molybdenum, tungsten and titanium is 0%.

9. The electroplated coating of claim 1, further comprising at least one of Pt, Ir and Pd or any combination thereof.

10. The electroplated coating of claim 1, said coating is characterized by the absence of a brittle layer in the inter-diffusion zone between the substrate and the coating.

11. The electroplated coating of claim 1, further comprising about 8-12 wt % cobalt, about 6-9 wt % chromium, about 5.5-7 wt % aluminum, wherein the total of titanium, zirconium, carbon, boron, molybdenum, tungsten, rhenium, and tantalum is contained in an amount between about 3-12 wt % and the remainder of nickel.

12. The electroplated coating of claim 1, wherein said coating is applied as a stand-alone overlay coating.

13. The electroplated coating of claim 1, wherein said coating is applied as a bond coating for thermal barrier coating.

14. The electroplated coating of claim 1, where said coating is applied as a free-standing electroformed material.

15. The electroplated coating of claim 1, where said coating is applied as a free-standing electroformed material with the near-net shape of the desired object.

16. The electroplated coating of claim 1, where said coating is applied as a free-standing electroformed micro-specimen for micro-electro-mechanical systems (MEMS) applications.

17. A method of forming an electroplated coating comprising:
providing a superalloy substrate;
providing a plating solution with a precursor alloy powder wherein said precursor alloy powder comprises CoCrAlX or NiCoCrAlX, where X is one or more of Re, Ta, Mo, W, Hf, Y, Si, Zr, C, B or any combination thereof;
electroplating nickel and said precursor alloy powder onto the substrate to form a green coating having a composition comprising about 5-15 wt % cobalt, about 5-10 wt % chromium, about 5-10 wt % aluminum, 0 to about 6 wt % molybdenum, 0 to about 6 wt % tungsten, 0 to about 6 wt % tantalum, 0 to about 6 wt % rhenium, 0 to about 2 wt % titanium, 0 to about 1 wt % zirconium, 0 to about 1 wt % hafnium, 0 to about 1 wt % yttrium, 0 to about 1 wt % silicon, 0 to about 0.2 wt % carbon, 0 to about 0.03 wt % boron and a remainder of nickel;
performing a first heat treatment of said green coating at a temperature ranging from about 2000° F. to 2400° F. for a duration of about 2 to about 6 hours;
diffusing the CoCrAlX or NiCoCrAlX powder composition into a nickel plating matrix to produce an intermediate coating;
performing a second heat treatment of said composition at a temperature ranging from about 1400° F. to about 1950° F. for a duration of about 6 to about 48 hours; and
precipitating a gamma-prime nickel aluminide phase (γ'-Ni$_3$Al phase) to produce the electroplated coating.

18. The method of claim 17, further comprising the steps of:
anchoring abrasive particles to said electroplated coating by electroplating from a bath of plating solution having the abrasive particles suspended therein; and
infilling around the abrasive particles with said electroplated coating.

19. The method of claim 17, wherein said substrate is a turbine blade having a tip and said abrasive particles comprise boron nitride particles.

* * * * *